United States Patent [19]

Siegel et al.

[11] Patent Number: 5,102,096

[45] Date of Patent: Apr. 7, 1992

[54] CONNECTION OF A MAGNET VALVE TO A HOUSING BLOCK

[75] Inventors: Heinz Siegel, Stuttgart; Norbert Alaze, Markgroeningen; Klaus Schmidt, Schwieberdingen, all of Fed. Rep. of Germany

[73] Assignee: Robert Bosch GmbH, Stuttgart, Fed. Rep. of Germany

[21] Appl. No.: 673,442

[22] Filed: Mar. 22, 1991

[30] Foreign Application Priority Data

Apr. 30, 1990 [DE] Fed. Rep. of Germany ....... 4013875

[51] Int. Cl.⁵ .............................................. F16K 31/06
[52] U.S. Cl. ................... 251/129.15; 335/250; 335/278
[58] Field of Search ............. 251/129.15, 129.17; 137/454.2, 454.4; 335/250, 278

[56] References Cited

U.S. PATENT DOCUMENTS 2,619,986 12/1952 Goepfrich ...................... 251/129.17

FOREIGN PATENT DOCUMENTS 3907764 9/1990 Fed. Rep. of Germany .
1429907 3/1976 United Kingdom .

Primary Examiner—Arnold Rosenthal
Attorney, Agent, or Firm—Edwin E. Greigg; Ronald E. Greigg

[57] ABSTRACT

The invention is directed to a connection that can be easily made, produced at little expense, and can carry heavy loads. A housing block has a receiving bore with undercut portions, embodied by a groove, that extend over circumferential regions of this bore. A magnet valve has primary flange segments formed onto the valve body, which along their end face which face toward the opening of the receiving bore of the housing block are conically limited in cross section. These flange segments which extend over circumferential regions of the magnet valve body engage the undercut portions, formed in accordance with the cross section of the flange segments, in the manner of a bayonet mount type of connection. The connection is particularly suitable for use in hydraulic vehicle brake systems, where particularly strong forces between the magnet valve and the housing block must be absorbed.

7 Claims, 2 Drawing Sheets

CONNECTION OF A MAGNET VALVE TO A HOUSING BLOCK

BACKGROUND OF THE INVENTION

The invention is based on a bayonet mount-like connection of a magnet valve to a housing block.

Magnet valves, upon introduction into a receiving bore of the housing block, are often put in contact with supply lines and removal lines for pressure fluid that discharge into this bore. The high forces exerted by the pressure fluid thus act upon the mounted magnet valves and must be absorbed by the housing block. The form-fitting connections of magnet valves to the housing block must therefore withstand very heavy loads, especially in the case of magnet valves of hydraulic vehicle brake systems. Accordingly, such connections are not only embodied expensively in terms of construction, but cannot be joined together except with a relatively major expenditure of time. Bayonet mount-like connections of magnet valves to a valve holder known in fuel distributors for fuel injection systems of internal combustion engines (German Patent Application P 39 07 764.0) have a relatively large radially extending flange of the magnet valve body, which can be made only at considerable expense and does not have the strength required for vehicle brake systems.

OBJECT AND SUMMARY OF THE INVENTION

The bayonet mount-like connection according to the invention, has the advantage over the prior art that on the one hand the magnet valve body can be kept smaller in diameter and requires less metal-cutting work, and on the other hand the flange segments can be economically made in cutting of the jacket sleeve edge in the course of manufacture of the jacket sleeve as a deep-drawn part.

The embodiment of the connection of the magnet valve to the housing block defined also can be produced in a simplified manner and meets many requirements in terms of strength.

The further feature of the connection combines the advantages of the known snap ring connection, in which major forces are transmitted to the housing block at an acute angle to the longitudinal axis of the magnet valve, and that of fast and simple assembly which is characteristic of connections of the bayonet mount type.

In a connection of the bayonet mount type, as described hereinafter, a heavy load capacity is also attained, on the condition of adequate dimensioning of the flange segment in the axial direction, especially because of the fact that the transmission of force from the hydraulically heavily loaded magnet valve body takes place directly into the housing block.

A further favorable aspect in terms of strength is the orientation of the flange segment phase with which the magnet valve rests on the undercut of the housing block.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
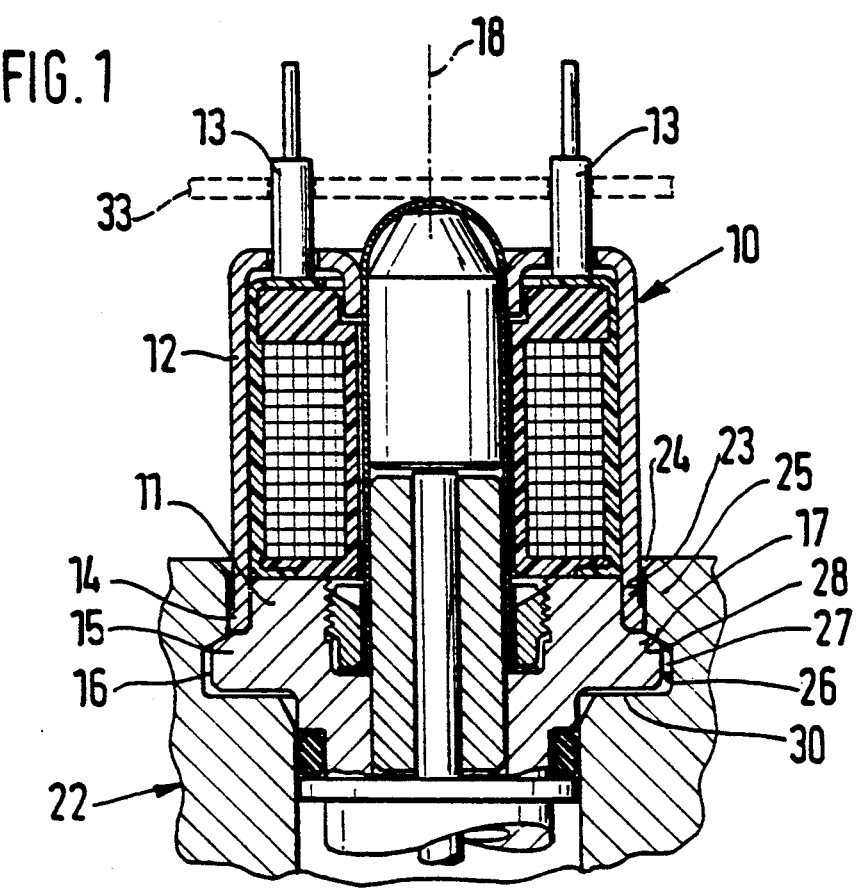
FIG. 1 is a longitudinal section through a magnet valve that is held in a receiving bore of a housing block with a first exemplary embodiment of a bayonet mount-like connection.
Figure 2:
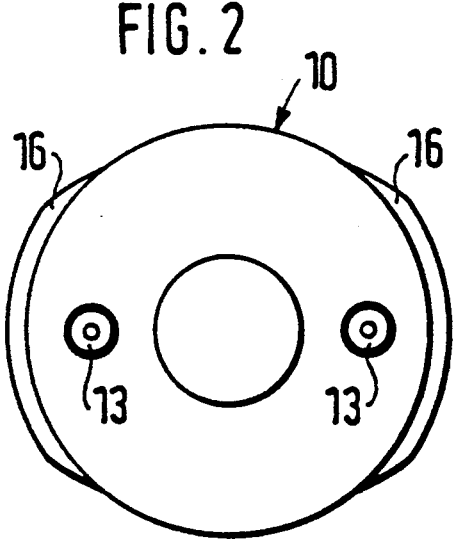
FIG. 2 is a plan view on the magnet valve.

The first exemplary embodiment shown in FIG. 1 has a magnet valve 10 with a magnet valve body 11 made as a turned part, onto which a jacket sleeve 12 produced by deep drawing has been pressed. The magnet valve 10 has two contact pins 13 penetrating the jacket sleeve 12 on its upper face end. The terminal edge 14 of the jacket sleeve 12 remote from the contact pins 13 adjoins a flange 15 of the magnet valve body 11. The flange 15 is partly removed in an oval turning apparatus in the course of production of the magnet valve body 11, so that two diametrically opposed primary flange segments 16 remain, each extending over approximately 90° of the circumference of the magnet valve 10 (FIG. 2). As can be seen from FIG. 1, these flange segments 16 have a slight radial extension, while they are relatively solidly embodied in the axial direction. The primary flange segments 16 have a conically defined end face 17 toward the jacket sleeve 12, so that in cross section they are tapered relatively outward at an angle of approximately 60° with respect to the longitudinal axis 18 of the magnet valve 10.

A substantial portion of the axial length of the magnet valve 10 is received in a housing block 22. The housing block has a receiving bore 23, the diameter of which is approximately equivalent to that of the jacket sleeve 12 (see FIG. 1). Beginning at the opening 24 of the receiving bore 23, a bore wall segment 25 is followed by an undercut 27 embodied by a groove 26. Toward the bore wall segment 25, the undercut has a groove side face 28 having the same conical angle as the flange segments 16 of the magnet valve body 15. Adjacent to the groove 26, the receiving bore 23 is embodied in stepped fashion, with an increasing bore depth.

Figure 3:
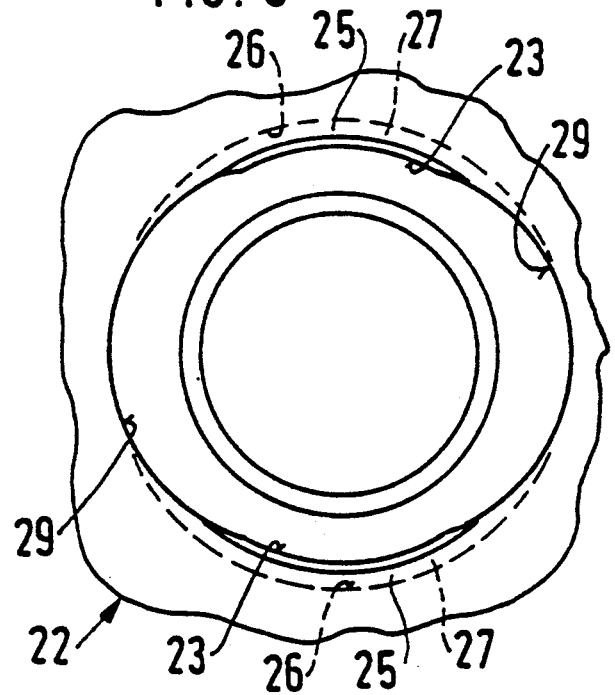
FIG. 3 is a plan view on the receiving bore of the housing block.

As can be seen from FIG. 3, the bore wall segment 25 is limited, by free cuts 29, to two diametrically opposed regions of the receiving bore 23. These free cuts 29 are produced by means of an end-milling cutter introduced axially into the receiving bore 23 and radially displaced in opposite directions and having a corresponding diameter, so that the bore wall segments 25 are limited to a circumferential region of approximately 90° each of the receiving bore 23.

In the mounting of the magnet valve 10, the flange segments 16, in the orientation shown in FIG. 2, can be introduced into the free cuts 29 of the receiving bore 23, which are located as in FIG. 3 when the magnet valve 10 is inserted with its magnet valve body 11 into the receiving bore 23. Once the magnet valve body 11 has been positioned relative to a bore step 30 of the receiving bore 23 bordering in the groove 26, the magnet valve 10 is rotated by 90 about its longitudinal axis 18, so that the flange segments 16 engage the undercuts 27 of the receiving bore 23. The result is a bayonet mount-like connection of the magnet valve 10 to the housing block 22. Unintentional twisting of the magnet valve 10 in the mounted position can be prevented, as indicated in FIG. 1 by dashed lines, by means of a wall 33, which receives the contact pins 13, of a hood not otherwise shown. The elimination of axial play in the bayonet mount-like connection is effected by pressing the end face 17 of the flange segments 16 against the groove side face 28 of the undercut 27 as a result of the hydraulic forces which act upon the magnet valve 10, that also seek to push the magnet valve out of the receiving bore 23. Because of the relatively solidly embodied flange segments 16 and the correspondingly oriented contact faces between the magnet valve body 11 and the housing block 22, forces extending at an acute angle to the longitudinal axis 18 of the magnet valve 10 can be absorbed by the housing block 22 in a manner that is favorable from the standpoint of mechanical strength.

Figure 4:
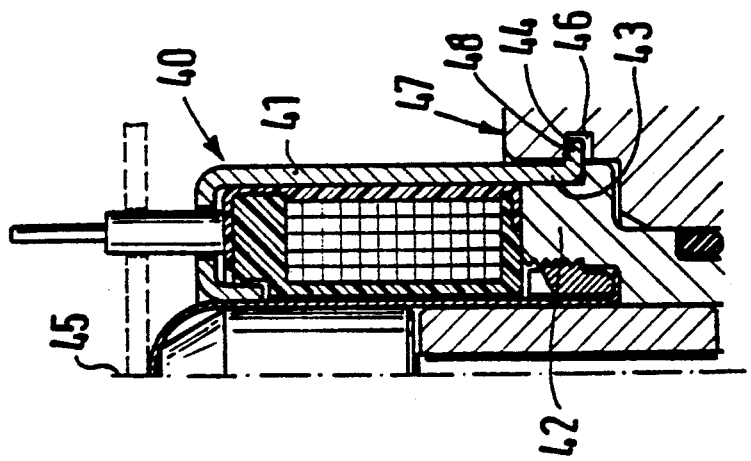

The second exemplary embodiment, shown in FIG. 4, has a magnet valve 40, the deep-drawn jacket sleeve 41 of which is provided with flange segments 44 on the jacket sleeve edge 43 coaxially fitting over the magnet valve body 42. The flange segments 44 extend radially relative to the longitudinal axis 45 of the magnet valve 40 along the jacket sleeve edge 43, in a plane extending at right angles to the longitudinal axis 45. The flange segments 44 have a contour equivalent to the exemplary embodiment of FIG. 2 and in the axial direction have a wall thickness equivalent to that of the jacket sleeve 41. The groove 46 of the housing block 47 is dimensioned in accordance with the dimensions of the flange segments 44. The groove 46 has a groove side face 48, which cooperates with the flange segments 44, that likewise is located in a plane extending at right angles to the longitudinal axis 45 of the magnet valve 40. Because of the wall thickness of the jacket sleeve 41, the flange segments 44 cannot transmit as strong forces as in the first exemplary embodiment from the magnet valve 40 to the housing block 47. Nevertheless, this embodiment can be sufficient for many load situations.

Figure 5:
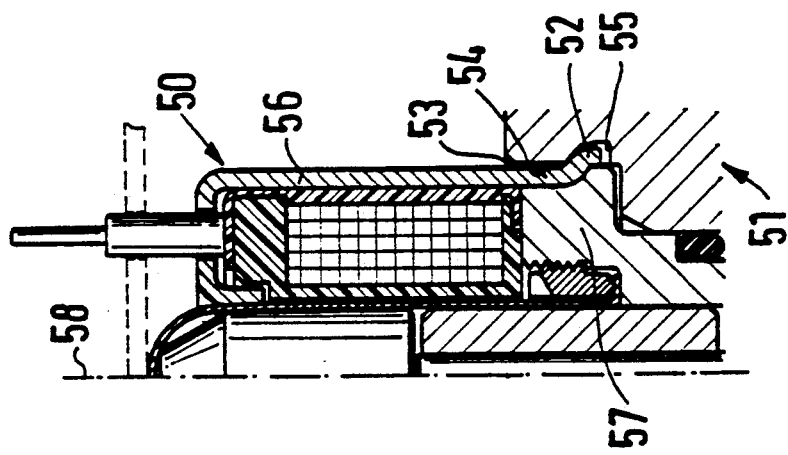

The third exemplary embodiment of the bayonet mount-like connection shown in FIG. 5 between the magnet valve 50 and the housing block 51 differs from the preceding embodiments in that the flange segments 52, toward the opening 53 of the receiving bore 54 of the housing block 51, are defined in cross section at least approximately as a quarter circle. Correspondingly, the groove 55 toward the opening 53 of the receiving bore 54 is likewise limited to a quarter circle in cross section. The flange segments 52 formed onto the jacket sleeve 56 of the magnet valve 50 and supported on the magnet valve body 57 are therefore capable of transmitting forces to the housing block 51 the operative direction of which is approximately 45 from the longitudinal axis 58 of the magnet valve 50. The force transmission is thus effected in the manner of a snap ring connection, which as is well-known is capable of transmitting relatively strong forces.

Figure 6:
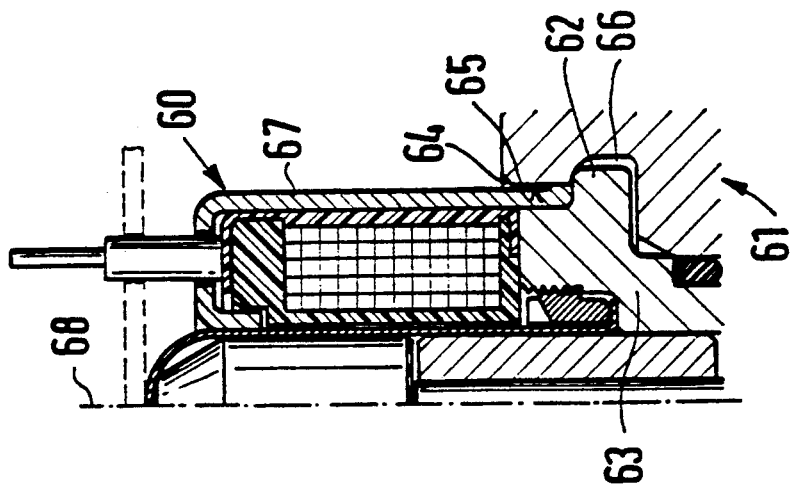
FIGS. 4-6, each in fragmentary form, show three further exemplary embodiments of connections of the bayonet mount-type.

The fourth exemplary embodiment of the bayonet mount-like connection, shown in FIG. 6, of the magnet valve 60 to the housing block 61 combines the variants of FIGS. 1 and 5. The flange segments 62 of the magnet valve body 63 are relatively solid in cross section and toward the opening 64 of the receiving bore 65 are at least approximately limited to a quarter circle. Correspondingly, the groove 66 of the housing block 61 is likewise limited in cross section to a quarter circle. As in the preceding exemplary embodiment, the forces are transmitted to the housing block 61 in an operative direction extending approximately 45° from the longitudinal axis 68 of the magnet valve 60 whenever the flange segments 62 engage the groove 66, under the influence of the expulsion force exerted on the magnet valve. The jacket sleeve 67, pressed onto the magnet valve body 63, as in the exemplary embodiment of FIG. 1, does not contribute to the formation of the flange segments 62.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A bayonet mount-like connection for connecting a magnet valve to a housing block having a stepped receiving bore, said stepped receiving bore having a large diameter portion and a smaller diameter portion that forms a step surface therebetween, said stepped receiving bore is provided with oppositely disposed circumferential undercut portions in said large diameter portion juxtaposed said step surface, each of which extend from about 45° to about 90° to form grooves which extend along said oppositely disposed circumferential undercut portions of said stepped receiving bore, a cylindrical magnet valve body is received in said stepped receiving bore of said housing block and has a circumferential flange having a diameter substantially the same as said large diameter portion of said stepped receiving bore with said flange seated on said step surface of said stepped receiving bore, a deep-drawn jacket sleeve having an elongated portion of one diameter with a terminal end forming oppositely disposed circumferential primary flange segments of from about 45° to about 90° of greater diameter, and by rotation of said deep-drawn jacket sleeve by from 45° to 90° said groove in said oppositely disposed circumferential undercut portions is engaged by said primary flange segments of said deep-drawn jacket sleeve that extend over said circumferential flange of said cylindrical magnet valve body.

2. A bayonet mount-like connection as defined by claim 1, in which said primary flange segments of said jacket sleeve extend radially relative to a longitudinal axis (45) of the magnet valve body (40) and engage a groove side face (48) in said housing block that is located in a plane extending at right angles to the longitudinal axis (45).

3. A bayonet mount-like connection as defined by claim 1, in which said flange segments that extend outwardly of said jacket sleeve are limited in cross section toward an opening (53) of the stepped receiving bore (54) at least approximately in a quarter circle, and thereby adapted to engage the groove (55) in said housing block, which is also limited in cross section to a quarter circle.

4. A bayonet mount-like connection as defined by claim 2, in which the primary flange segments are tapered radially outward in cross section at an angle of preferably 60° with respect to the longitudinal axis (45) of the magnet valve (10).

5. A bayonet mount-like connection as set forth in claim 1, in which said terminal edge of said deep-drawn jacket sleeve includes outwardly extending flanges which are secured in said groove in said housing block.

6. A bayonet mount-like connection as set forth in claim 1, in which said outwardly extending flanges of said deep-drawn jacket sleeve are at a right angle to said axis.

7. A bayonet mount-like connection as set forth in claim 1, in which said terminal edge of said deep-drawn jacket sleeve includes outwardly extending flanges which surround a portion of said magnet valve body.

* * * * *